United States Patent
Kim et al.

(10) Patent No.: US 9,618,063 B2
(45) Date of Patent: Apr. 11, 2017

(54) METHOD FOR CONTROLLING CREEP DRIVING OF VEHICLE

(71) Applicants: Hyundai Motor Company, Seoul (KR); Kia Motors Corporation, Seoul (KR)

(72) Inventors: Jin Sung Kim, Suwon-Si (KR); Ju Hyun Nam, Bucheon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/934,990

(22) Filed: Nov. 6, 2015

(65) Prior Publication Data
US 2017/0016494 A1   Jan. 19, 2017

(30) Foreign Application Priority Data
Jul. 15, 2015 (KR) .................. 10-2015-0100149

(51) Int. Cl.
*F16D 48/06*   (2006.01)

(52) U.S. Cl.
CPC ...... *F16D 48/06* (2013.01); *F16D 2500/1045* (2013.01); *F16D 2500/1107* (2013.01); *F16D 2500/50206* (2013.01)

(58) Field of Classification Search
None
See application file for complete search history.

(56) References Cited

U.S. PATENT DOCUMENTS

| 5,403,249 | A | * | 4/1995 | Slicker | F16D 48/06 192/103 R |
|---|---|---|---|---|---|
| 5,531,304 | A | * | 7/1996 | Ishino | F16H 47/04 192/221 |
| 8,827,868 | B2 | | 9/2014 | Tao et al. | |
| 2013/0332038 | A1 | * | 12/2013 | Williams | F16D 48/00 701/59 |
| 2014/0087918 | A1 | | 3/2014 | Kim et al. | |

FOREIGN PATENT DOCUMENTS

| JP | 9-133610 A | 5/1997 |
|---|---|---|
| JP | 2003-262240 A | 9/2003 |
| KR | 10-2011-0107066 A | 9/2011 |
| KR | 10-2012-0058147 A | 6/2012 |

* cited by examiner

*Primary Examiner* — Edwin A Young
(74) *Attorney, Agent, or Firm* — Morgan, Lewis & Bockius LLP

(57) ABSTRACT

A method for controlling creep driving of a vehicle may include determining, by a controller for controlling a dry clutch, whether transfer torque of the dry clutch is 0 or less and a control error resulting from subtraction of a current car speed from a target creep speed is 0 or less, which is referred to as a step of determining condition, and stopping, by the controller, accumulation of an integral control component for creep controlling if the condition in the step of determining condition is met, which is referred to as a step of stopping accumulation.

5 Claims, 3 Drawing Sheets

METHOD FOR CONTROLLING CREEP DRIVING OF VEHICLE

CROSS REFERENCE TO RELATED APPLICATION

The present application claims priority to Korean Patent Application No. 10-2015-0100149, filed, Jul. 15, 2015, the entire contents of which is incorporated herein for all purposes by this reference.

BACKGROUND OF THE INVENTION

Field of the Invention

The present invention generally relates to a method for controlling creep driving of a vehicle and, more particularly, to a method for implementing creep driving of a vehicle equipped with an Automated Manual Transmission (AMT) or Dual Clutch Transmission configured to apply driving force to an input shaft of the transmission through a dry clutch.

Description of Related Art

As well known to those skilled in the art, an Automated Manual Transmission (AMT) or Dual Clutch Transmission (DCT) that uses a dry clutch is configured to supply driving force from an engine or motor to an input shaft of the transmission via the dry clutch without a torque converter, so the control performance of the dry clutch has a significant influence on take-off and transmission performance of the vehicle.

As for creep driving, the driver controls the dry clutch to follow a certain target creep speed without manipulating an accelerator pedal, in which case the control performance of the dry clutch still has a high influence on a feeling of creep driving and a feeling of acceleration when the vehicle is accelerated right after creep driving.

Generally, a Proportional Integral (PI) controller is used to control the creep driving, and a simple method including calculating proportional and integral control components and combining the components to output a new creep control signal is used for a difference between a target creep speed and a current speed.

However, in the case that the simple PI controller is used to control the creep driving of a vehicle, when the vehicle is driving downhill, the vehicle accelerates due to gravity and may happen to exceed the target creep speed. At this time, even in a situation where the dry clutch has already been completely disengaged and thus the transfer torque actually has become zero, the PI controller keeps accumulating the integral control component in the negative direction because the vehicle speed exceeds the target creep speed. In this situation where the integral control component has been accumulated in the negative direction, if the vehicle reached the end of the slope and needs to be accelerated to drive uphill, a correct integral control component is not reflected in creep control signals until the integral control component having thus far been accumulated in the negative direction is accumulated into zero again, thereby decreasing re-acceleration performance of the vehicle due to delays in increase of creep torque.

Furthermore, while the vehicle repeatedly stops and goes in a traffic jam, a process is repeated where the integral control component having thus far been accumulated remains if the driver stops the vehicle by stepping on the brake, and is accumulated again if the driver starts the vehicle again with creep driving. If the integral control component increases too much, transfer torque of the dry clutch should be excessively controlled when the creep driving is to be resumed, thus causing shock to the dry clutch and causing the vehicle to lurch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling creep driving of a vehicle equipped with an Automated Manual Transmission (AMT) or Dual Clutch Transmission (DCT) including a dry clutch to prevent delays in feeling of re-acceleration and occurrence of lurching while the vehicle creeps, by reducing or preventing influences on creep controlling due to an inappropriate integral control component when creep driving is controlled in the vehicle.

In accordance with an aspect of the present invention, a method for controlling creep driving of a vehicle is provided. The method includes determining, by a controller for controlling a dry clutch, whether transfer torque of the dry clutch is 0 or less and a control error resulting from subtraction of a current car speed from a target creep speed is 0 or less, which is referred to as a step of determining condition, and stopping, by the controller, accumulation of an integral control component for creep controlling if the condition in the step of determining condition is met, which is referred to as a step of stopping accumulation.

The controller may use information about the transfer torque that the controller itself has and information about a car speed received from outside to perform the step of determining condition and the step of stopping accumulation, and may feedback control the dry clutch by creating a creep control signal to instruct a clutch actuator to drive the dry clutch.

After the step of stopping accumulation begins, the controller may further be configured to reduce an integral control component of a point right before the step of stopping accumulation begins with a predetermined ratio as time goes by, as long as the condition in the step of determining condition is met, which is referred to as a step of reducing amount of integration.

The controller may be configured to create a creep control signal to control the dry clutch by adding a proportional control component to an integral control component output while performing the step of reducing amount of integration.

The predetermined ratio to decrease the integral control component in the step of reducing amount of integration may be implemented by multiplying a forgetting factor at each sampling point of the controller, and the forgetting factor may be set to a value in a range between 0 to 1.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
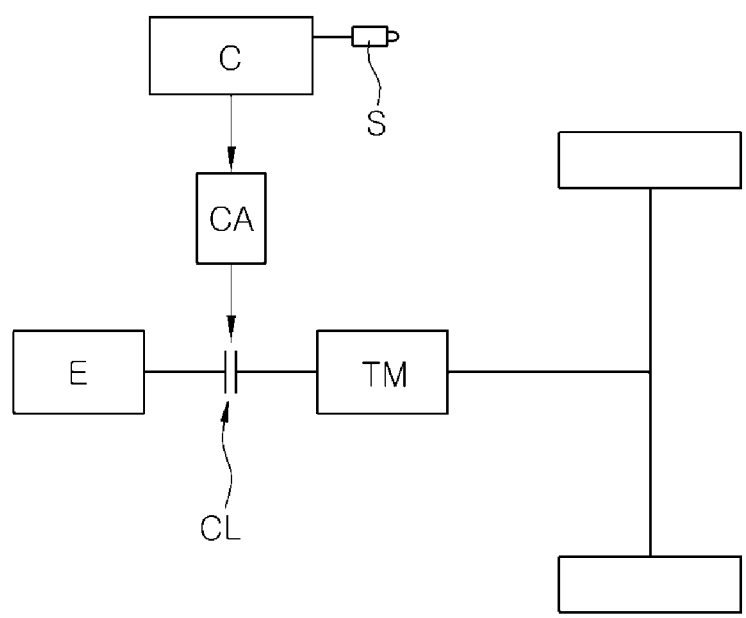
FIG. 1 is a conceptual diagram of a vehicle having a dry clutch to which the present invention can be applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

Reference now should be made to the drawings, in which the same reference numerals are used throughout the different drawings to designate the same or similar components.

FIG. 1 is a conceptual diagram of a vehicle having a dry clutch to which the present invention can be applied, where the vehicle includes a dry clutch CL located between an engine E and a transmission TM for converting driving force of the engine E into a state to be supplied to the transmission TM, and a clutch actuator CA for driving the dry clutch CL under control of a controller C, which receives information about a car speed from a car speed sensor S.

The controller C may be configured to receive the information about a car speed not only directly from the car speed sensor S but also from Controller Area Network (CAN) communication, and may also be configured to receive other various information from the engine E, transmission TM, and dry clutch CL.

The transmission TM may be any type of transmission that may receive the driving force from the engine E via the dry clutch CL, e.g., a Dual Clutch Transmission (DCT), an Automated Manual Transmission (AMT), etc.

Figure 2:
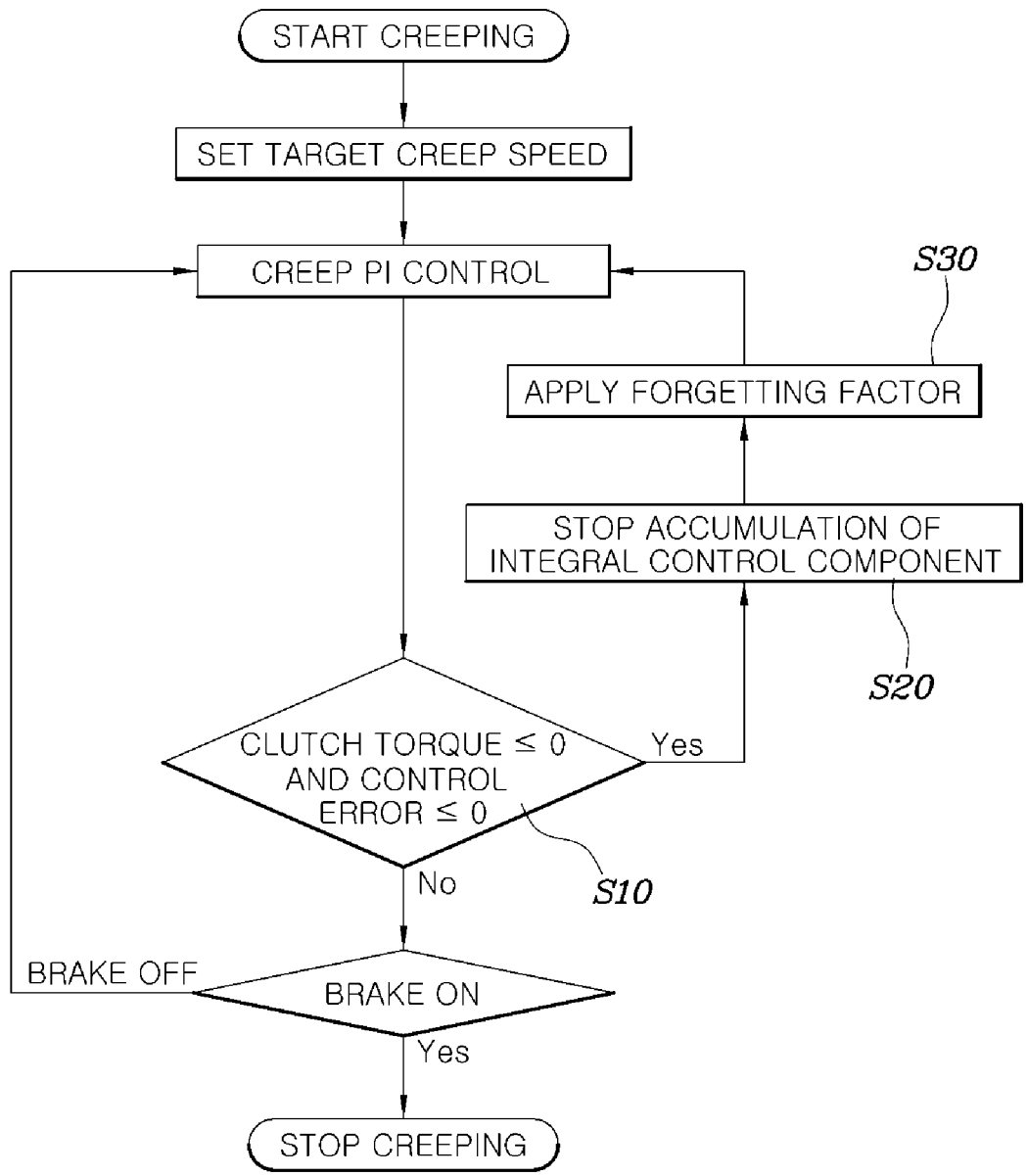
FIG. 2 is a flowchart illustrating a method for controlling creep driving of a vehicle, according to an embodiment of the present invention.

Referring to FIG. 2, in an exemplary embodiment of the present invention, a method for controlling creep driving of a vehicle includes determining, by the controller C for controlling the dry clutch CL, whether transfer torque of the dry clutch CL is 0 or less and a control error resulting from subtraction of a current car speed from a target creep speed is 0 or less, which is called a step of determining condition S10, and stopping, by the controller C, accumulation of an integral control component for creep controlling if the condition in the step of determining condition S10 is met, which is called a step of stopping accumulation S20.

Specifically, the present invention is to prevent a feeling of delay in acceleration of the vehicle through resolution of an unnecessarily accumulated integral control component in a subsequent creep controlling process, by avoiding further accumulation of the integral control component from control errors in the negative direction in the step of stopping accumulation S20, if the car speed exceeds the target creep speed and thus the control error is less than 0, even in a situation where transfer torque of the dry clutch CL has become 0 or less, which actually means that the dry clutch CL has already been completely disengaged and no driving force is transferred to the transmission, while the controller C controls creep driving.

The controller C uses information about the transfer torque that the controller C itself has and information about a car speed received from outside to perform the step of determining condition S10 and the step of stopping accumulation S20, and feedback controls the dry clutch CL by creating a creep control signal to instruct the clutch actuator CA to drive the dry clutch CL.

For the transfer torque of the dry clutch CL, the controller may use what is calculated in advance and stored as a target control value to be controlled, or may use what is calculated and obtained using information fed back from the dry clutch CL or the clutch actuator CA.

After the step of stopping accumulation S20 begins, the controller C is further configured to reduce the integral control component of a point right before the step of stopping accumulation S20 begins with a certain ratio as time goes by, as long as the condition in the step of determining condition S10 is met, which is called a step of reducing amount of integration S30.

Accordingly, the integral control component accumulated as the vehicle repeatedly stops and goes in a traffic jam is relieved in the step of reducing amount of integration S30, thereby preventing shock and lurching that might occur when the vehicle resumes creep driving after stopping.

Specifically, in a situation where the vehicle has already reached the target creep speed and remains at a constant speed even while the vehicle repeatedly stops and goes in a traffic jam, the clutch transfer torque transferred via the dry clutch is actually 0 and the control error is 0, which satisfies the condition in the step of determining condition S10. The step of reducing amount of integration S30 may then be performed after the step of stopping accumulation S20 begins, to eliminate the accumulated integral control component, thereby preventing occurrence of shock and lurching due to application of an excessive integral control component when the vehicle resumes creep driving after stopping.

In the exemplary embodiment, the certain ratio to decrease the integral control component in the step of reducing amount of integration S30 is implemented by multiplying a forgetting factor at each sampling point of the controller C. The forgetting factor may be set to a value larger than 0 and less than 1.

For example, assuming that the integral control component of a point right before the step of stopping accumulation S20 begins is 10 and the forgetting factor is set to 0.9, the integral control component to be used to control the dry clutch CL at the first sampling point after the step of stopping accumulation S20 begins is calculated as 10*0.9=9, and the integral control component to be used to control the dry clutch CL at the second sampling point is calculated as 9*0.9=8.1.

As such, as long as the condition in the step of determining condition S10 is constantly met, as the sampling time of the controller C goes by, repetitive multiplication of the integral control component by the forgetting factor has the accumulated integral control component gradually converge to 0, thereby preventing occurrence of shock due to sudden changes of the integral control component.

The controller C may basically have the same feature of a PI controller to create a creep control signal to control the dry clutch CL by adding a proportional control component to the integral control component output while performing the step of reducing amount of integration S30.

Figure 3:
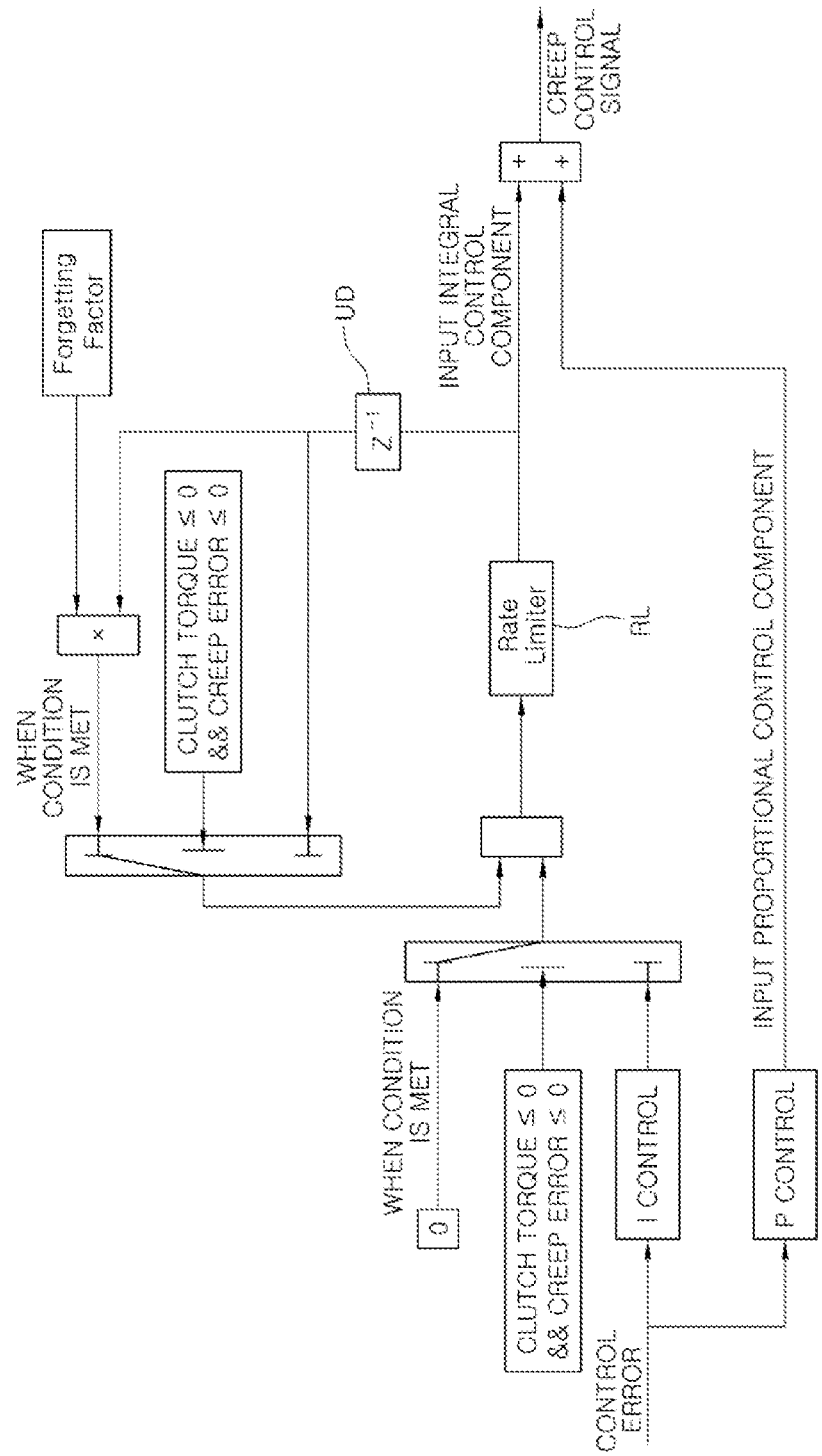
FIG. 3 is a conceptual diagram of a controller for implementing a control method according to an embodiment of the present invention.

FIG. 3 is a conceptual diagram of a PI controller that implements the control method as described above, where an integral control component and a proportional control component are obtained from a control error, which is a difference between a target creep speed and a current car speed, and the integral control component is added to the previous integral control component of the previous sampling point provided by a unit delay UD as long as the condition in the step of determining condition S10 is not met, and then combined with the proportional control component to forming a final creep control signal.

If the condition in the step of determining condition S10 is met, the integral control component produced from the control error is ignored and the value of 0 is added to the integral control component of the previous sampling point provided through the unit delay UD, which is then combined with the proportional control component to form a final creep control signal. Therefore, accumulation of a new integral control component is stopped, implementing the step of stopping accumulation S20.

Since the integral control component of the previous sampling point provided through the unit delay UD meets the condition in the step of determining condition S10, it is used after being multiplied by the forgetting factor determined to be a value between 0 and 1. As a result, as the sampling is repeated, the integral control component gradually converges to 0, thus implementing the step of reducing amount of integration S30.

For reference, if the forgetting factor is set to a value close to 1, the integral control component decreases relatively slowly, or if the forgetting factor is set to a value close to 0, the integral control component decreases more rapidly. Therefore, the forgetting factor may be properly chosen according to several experiments or something.

Furthermore, after the integral control component produced from the control error and the integral control component of the previous sampling point provided through the unit delay UD are combined, a rate limiter RL as shown in FIG. 3 may be used to prevent a rapid change of the combined integral control component more than a predetermined ratio, thereby securing control stability.

According to the exemplary embodiments of the present invention, delays in feeling of re-acceleration and occurrence of lurching while a vehicle equipped with an AMT or DCT including a dry clutch is creeping may be prevented by reducing or preventing influences on creep controlling due to an inappropriate integral control component when the creep driving is controlled in the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling creep driving of a vehicle, the method comprising:
   determining, by a controller for controlling a dry clutch, whether a transfer torque of the dry clutch is 0 or less and a control error resulting from subtraction of a current car speed from a target creep speed is 0 or less, which is referred to as a step of determining condition, and
   stopping, by the controller, accumulation of an integral control component for creep controlling when the condition in the step of determining condition is met, which is referred to as a step of stopping accumulation.

2. The method of claim 1, wherein the controller uses information about the transfer torque that the controller itself has and information about a car speed received from outside to perform the step of determining condition and the step of stopping accumulation, and feedback controls the dry clutch by creating a creep control signal to instruct a clutch actuator to drive the dry clutch.

3. The method of claim 1, wherein after the step of stopping accumulation begins, the controller is further configured to reduce an integral control component of a point right before the step of stopping accumulation begins with a predetermined ratio as time goes by, as long as the condition in the step of determining condition is met, which is referred to as a step of reducing amount of integration.

4. The method of claim 3, wherein the controller is configured to create a creep control signal to control the dry clutch by adding a proportional control component to an integral control component output while performing the step of reducing amount of integration.

5. The method of claim 3, wherein the predetermined ratio to decrease the integral control component in the step of reducing amount of integration is implemented by multiplying a forgetting factor at each sampling point of the controller, and
   wherein the forgetting factor is set to a value larger than 0 and less than 1.

* * * * *